United States Patent
Shimura

(10) Patent No.: US 8,081,694 B2
(45) Date of Patent: Dec. 20, 2011

(54) DEVICE, METHOD, AND PROGRAM FOR SIGNAL ANALYSIS, AND RECORDING MEDIUM

(75) Inventor: Takashi Shimura, Tochigi (JP)

(73) Assignee: Advantest Corporation, Tokyo (JP)

( * ) Notice: Subject to any disclaimer, the term of this patent is extended or adjusted under 35 U.S.C. 154(b) by 698 days.

(21) Appl. No.: 12/281,707

(22) PCT Filed: Mar. 8, 2007

(86) PCT No.: PCT/JP2007/055160
§ 371 (c)(1),
(2), (4) Date: Oct. 21, 2008

(87) PCT Pub. No.: WO2007/119364
PCT Pub. Date: Oct. 25, 2007

(65) Prior Publication Data
US 2009/0052510 A1    Feb. 26, 2009

(30) Foreign Application Priority Data
Mar. 20, 2006    (JP) .................................. 2006-077080

(51) Int. Cl.
*H04K 1/10*    (2006.01)
(52) U.S. Cl. ........................................................ 375/260
(58) Field of Classification Search .................... 375/260
See application file for complete search history.

(56) References Cited

U.S. PATENT DOCUMENTS

| | | | |
|---|---|---|---|
| 5,724,388 A | 3/1998 | Nagano et al. | |
| 5,963,589 A | 10/1999 | Nagano et al. | |
| 6,263,013 B1 * | 7/2001 | Hendrickson | 375/150 |
| 7,358,828 B2 | 4/2008 | Kato | |
| 2004/0131017 A1 | 7/2004 | Penther | |
| 2006/0018413 A1 * | 1/2006 | Gupta | 375/343 |
| 2007/0159621 A1 | 7/2007 | Ukita | |
| 2007/0171401 A1 | 7/2007 | Ukita | |

FOREIGN PATENT DOCUMENTS

| | | |
|---|---|---|
| JP | 7-297859 A | 11/1995 |
| JP | 8-056242 A | 2/1996 |
| JP | 2003-324406 A | 11/2003 |
| JP | 2004-222260 A | 8/2004 |

(Continued)

OTHER PUBLICATIONS

English language Abstract of JP 2005-303455 A.

(Continued)

*Primary Examiner* — Juan A Torres
(74) *Attorney, Agent, or Firm* — Greeblum & Bernstein, P.L.C.

(57) ABSTRACT

The time required for analyzing a modulation accuracy of a modulated signal is reduced. A signal analyzing device which analyzes a signal to be measured including multiple frames each of which includes a preamble and a data symbol, includes frame acquisition units which acquire the frame from the signal to be measured, a symbol demodulation unit which demodulates the acquired frame according to symbol demodulation, and a modulation accuracy deriving unit which derives a modulation accuracy based on an output from the symbol demodulation unit, where the frame acquisition unit considers a position displaced by an integer multiple of the length of the frame from a start frame positioned at a start of the signal to be measured as a position of a subsequent frame positioned after the start frame, and acquires the subsequent frame.

12 Claims, 8 Drawing Sheets

FOREIGN PATENT DOCUMENTS

| | | |
|---|---|---|
| JP | 2004-328503 A | 11/2004 |
| JP | 2005-117130 A | 4/2005 |
| JP | 2005-303387 A | 10/2005 |
| JP | 2005-303455 A | 10/2005 |
| JP | 2005-311583 A | 11/2005 |

OTHER PUBLICATIONS

English language Abstract of JP 2005-303387 A.
English language Abstract of JP 2005-311583 A.
English language Abstract of JP 2004-222260 A.
English language Abstract of JP 2004-328503 A.
English language Abstract of JP 2005-117130 A.
English language Abstract of JP 7-297859 A.
English language Abstract of JP 8-056242 A.
English language Abstract of JP 2003-324406 A.

* cited by examiner

DEVICE, METHOD, AND PROGRAM FOR SIGNAL ANALYSIS, AND RECORDING MEDIUM

TECHNICAL FIELD

The present invention relates to measurement of a signal modulated according to the orthogonal frequency division multiplexing (OFDM).

BACKGROUND ART

In an OFDM modulated signal which has conventionally been known, a unit of the signal transmitted at once is referred to as a frame. At a start of the frame, preambles are arranged followed by data symbols. The preamble includes short training sequences (STSs) and long training sequences (LTSs). It should be noted that, in an OFDM modulated signal employed by the IEEE 802.11a standard for a wireless local area network (LAN), a symbol "SIGNAL" is inserted between the preambles and the data symbols. The symbol SIGNAL is a symbol which indicates the number of data symbols in one frame, and a modulation scheme for the respective data symbols.

A modulation accuracy has conventionally been analyzed by demodulating the OFDM modulated signal (refer to Japanese Laid-Open Patent Publication No. 2003-324406, for example). According to IEEE 802.11a, upon the analysis of the modulation accuracy, it is specified that 20 or more frames which include 16 or more data symbols are to be measured. It should be noted that the frame is transmitted as a burst signal.

However, for the analysis of the OFDM modulated signal according to IEEE 802.11a, it is necessary to carry out a frame detection process at least twenty times. Moreover, it is also necessary to process the preambles and the symbol SIGNAL. Thus, it takes a long time to analyze the modulation accuracy of the OFDM modulated signal.

It is therefore an object of the present invention to reduce the time required for analyzing the modulation accuracy of a modulated signal.

DISCLOSURE OF THE INVENTION

According to one aspect of the present invention, a first signal analyzing device for analyzing a signal to be measured including multiple frames each of which includes a preamble and a data symbol, includes: a frame acquisition unit that acquires the frame from the signal to be measured; a symbol demodulation unit that demodulates the acquired frame according to symbol demodulation; and a modulation accuracy deriving unit that derives a modulation accuracy based on an output from the symbol demodulation unit, wherein the frame acquisition unit considers a position displaced by an integer multiple of the length of the frame from a start frame positioned at a start of the signal to be measured as a position of a subsequent frame positioned after the start frame, and acquires the subsequent frame.

According to the thus constructed first signal analyzing device, a signal analyzing device for analyzing a signal to be measured including multiple frames each of which includes a preamble and a data symbol can be provided.

A frame acquisition unit acquires the frame from the signal to be measured. A symbol demodulation unit demodulates the acquired frame according to symbol demodulation. A modulation accuracy deriving unit derives a modulation accuracy based on an output from the symbol demodulation unit. The frame acquisition unit considers a position displaced by an integer multiple of the length of the frame from a start frame positioned at a start of the signal to be measured as a position of a subsequent frame positioned after the start frame, and acquires the subsequent frame.

According to the first signal analyzing device, the frames may be successive in the signal to be measured.

According to another aspect of the present invention, a second signal analyzing device for analyzing a signal to be measured including a frame which includes a data symbol and multiple preambles, includes: a preamble acquisition unit that acquires the multiple preambles one by one; a data symbol acquisition unit that acquires the data symbol; a symbol demodulation unit that demodulates the data symbol according to symbol demodulation based on each of the acquired preambles; and a modulation accuracy deriving unit that derives a modulation accuracy based on an output from the symbol demodulation unit, wherein the data symbol demodulated by the symbol demodulation unit according to the symbol demodulation based on each of the acquired preambles is common.

According to the thus constructed second signal analyzing device, a signal analyzing device for analyzing a signal to be measured including a frame which includes a data symbol and multiple preambles can be provided.

A preamble acquisition unit acquires the multiple preambles one by one. A data symbol acquisition unit acquires the data symbol. A symbol demodulation unit demodulates the data symbol according to symbol demodulation based on each of the acquired preambles. A modulation accuracy deriving unit derives a modulation accuracy based on an output from the symbol demodulation unit. The data symbol demodulated by the symbol demodulation unit according to the symbol demodulation based on each of the acquired preambles is common.

According to the second signal analyzing device, in the frame, the multiple preambles may be successive, and the data symbol may be arranged subsequent to the multiple preambles.

According to the first or the second signal analyzing device, the signal to be measured may be a signal modulated according to the OFDM modulation, and the preamble may include only the long training sequence.

According to another aspect of the present invention, a signal analyzing method for analyzing a signal to be measured including multiple frames each of which includes a preamble and a data symbol, includes: a frame acquisition step that acquires the frame from the signal to be measured; a symbol demodulation step that demodulates the acquired frame according to symbol demodulation; and a modulation accuracy deriving step that derives a modulation accuracy based on an output from the symbol demodulation step, wherein the frame acquisition step considers a position displaced by an integer multiple of the length of the frame from a start frame positioned at a start of the signal to be measured as a position of a subsequent frame positioned after the start frame, and acquires the subsequent frame.

According to another aspect of the present invention, a signal analyzing method for analyzing a signal to be measured including a frame which includes a data symbol and multiple preambles, includes: a preamble acquisition step that acquires the multiple preambles one by one; a data symbol acquisition step that acquires the data symbol; a symbol demodulation step that demodulates the data symbol according to symbol demodulation based on each of the acquired preambles; and a modulation accuracy deriving step that derives a modulation accuracy based on an output from the symbol demodulation step, wherein the data symbol demodulated by the symbol demodulation step according to the symbol demodulation based on each of the acquired preambles is common.

Another aspect of the present invention is a program of instructions for execution by the computer to perform a signal analyzing process for analyzing a signal to be measured including multiple frames each of which includes a preamble and a data symbol, the signal analyzing process including: a frame acquisition step that acquires the frame from the signal to be measured; a symbol demodulation step that demodulates the acquired frame according to symbol demodulation; and a modulation accuracy deriving step that derives a modulation accuracy based on an output from the symbol demodulation step, wherein the frame acquisition step considers a position displaced by an integer multiple of the length of the frame from a start frame positioned at a start of the signal to be measured as a position of a subsequent frame positioned after the start frame, and acquires the subsequent frame.

Another aspect of the present invention is a program of instructions for execution by the computer to perform a signal analyzing process for analyzing a signal to be measured including a frame which includes a data symbol and multiple preambles, the signal analyzing process including: a preamble acquisition step that acquires the multiple preambles one by one; a data symbol acquisition step that acquires the data symbol; a symbol demodulation step that demodulates the data symbol according to symbol demodulation based on each of the acquired preambles; and a modulation accuracy deriving step that derives a modulation accuracy based on an output from the symbol demodulation step, wherein the data symbol demodulated by the symbol demodulation step according to the symbol demodulation based on each of the acquired preambles is common.

Another aspect of the present invention is a computer-readable medium having a program of instructions for execution by the computer to perform a signal analyzing process for analyzing a signal to be measured including multiple frames each of which includes a preamble and a data symbol, the signal analyzing process including: a frame acquisition step that acquires the frame from the signal to be measured; a symbol demodulation step that demodulates the acquired frame according to symbol demodulation; and a modulation accuracy deriving step that derives a modulation accuracy based on an output frog the symbol demodulation step, wherein the frame acquisition step considers position displaced by an integer multiple of the length of the frame from a start frame positioned at a start of the signal to be measured as a position of a subsequent frame positioned after the start frame, and acquires the subsequent frame.

Another aspect of the present invention is a computer-readable medium having a program of instructions for execution by the computer to perform a signal analyzing process for analyzing a signal to be measured including a frame which includes a data symbol and multiple preambles, the signal analyzing process including: a preamble acquisition step that acquires the multiple preambles one by one; a data symbol acquisition step that acquires the data symbol; a symbol demodulation step that demodulates the data symbol according to symbol demodulation based on each of the acquired preambles; and a modulation accuracy deriving step that derives a modulation accuracy based on an output from the symbol demodulation step, wherein the data symbol demodulated by the symbol demodulation step according to the symbol demodulation based on each of the acquired preambles is common.

BEST MODE FOR CARRYING OUT THE INVENTION

A description will now be given of embodiments of the present invention with reference to drawings.

Figure 1:
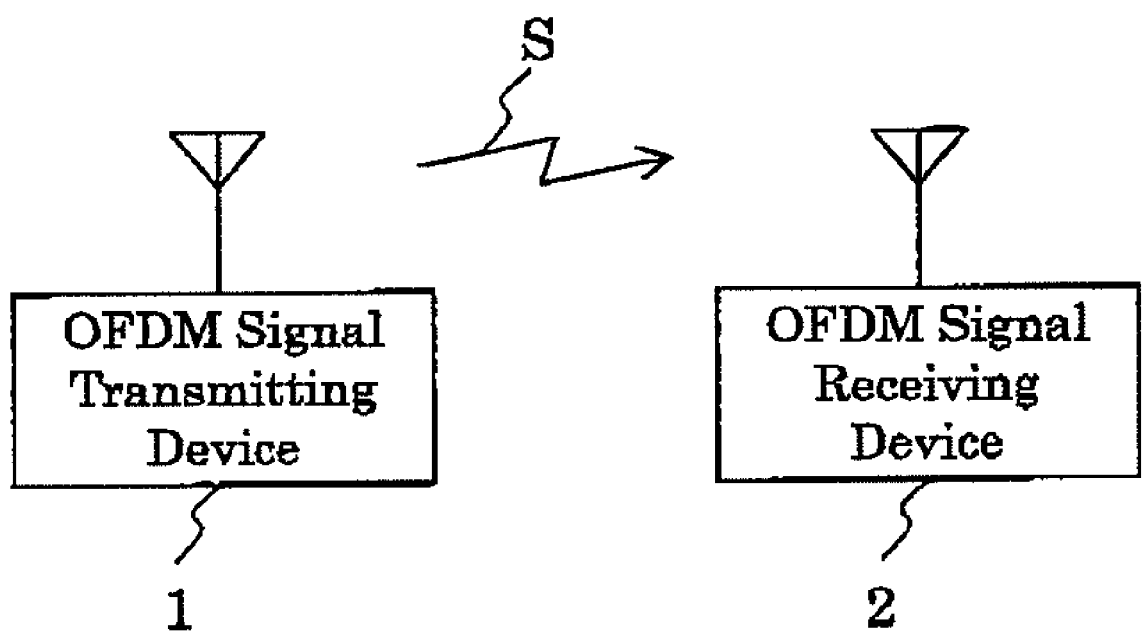
FIG. 1 is a diagram describing a concept of an OFDM signal receiving device 2 according to an embodiments of the present invention.

FIG. 1 is a diagram describing a concept of an OFDM signal receiving device 2 according to the embodiments of the present invention. An OFDM signal transmitting device 1 transmits a signal to be measured S modulated according to the orthogonal frequency division multiplexing (OFDM) modulation. The OFDM signal receiving device 2 receives the signal to be measured S, and analyses a modulation accuracy, for example.

Figure 2:
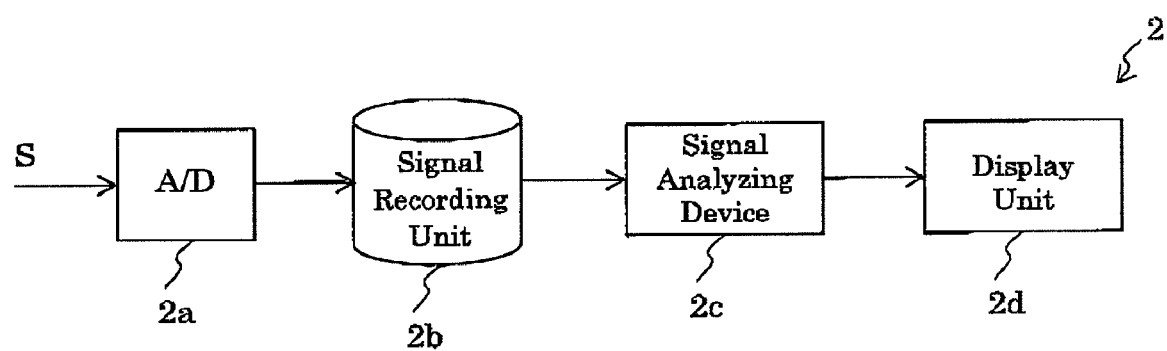
FIG. 2 is a functional block diagram showing a configuration of the OFDM signal receiving device 2.

FIG. 2 is a functional block diagram showing a configuration of the OFDM signal receiving device 2. The OFDM signal receiving device 2 includes an analog-to-digital (A/D) converter 2a, a signal recording unit 2b, a signal analyzing device 2c, and a display unit 2d.

The A/D converter 2a digitizes the signal to be measured S. The signal recording unit 2b records the digitized signal to be measured S. The signal analyzing device 2c analyzes the digitized signal to be measured S. For example, the signal analyzing device 2c analyzes the modulation accuracy of the signal to be measured S. The display unit 2d displays a result of the analysis carried out by the signal analyzing device 2c.

The configuration of the signal to be measured S and the configuration of the signal analyzing device 2c vary depending on the respective embodiments.

First Embodiment

Figure 3:
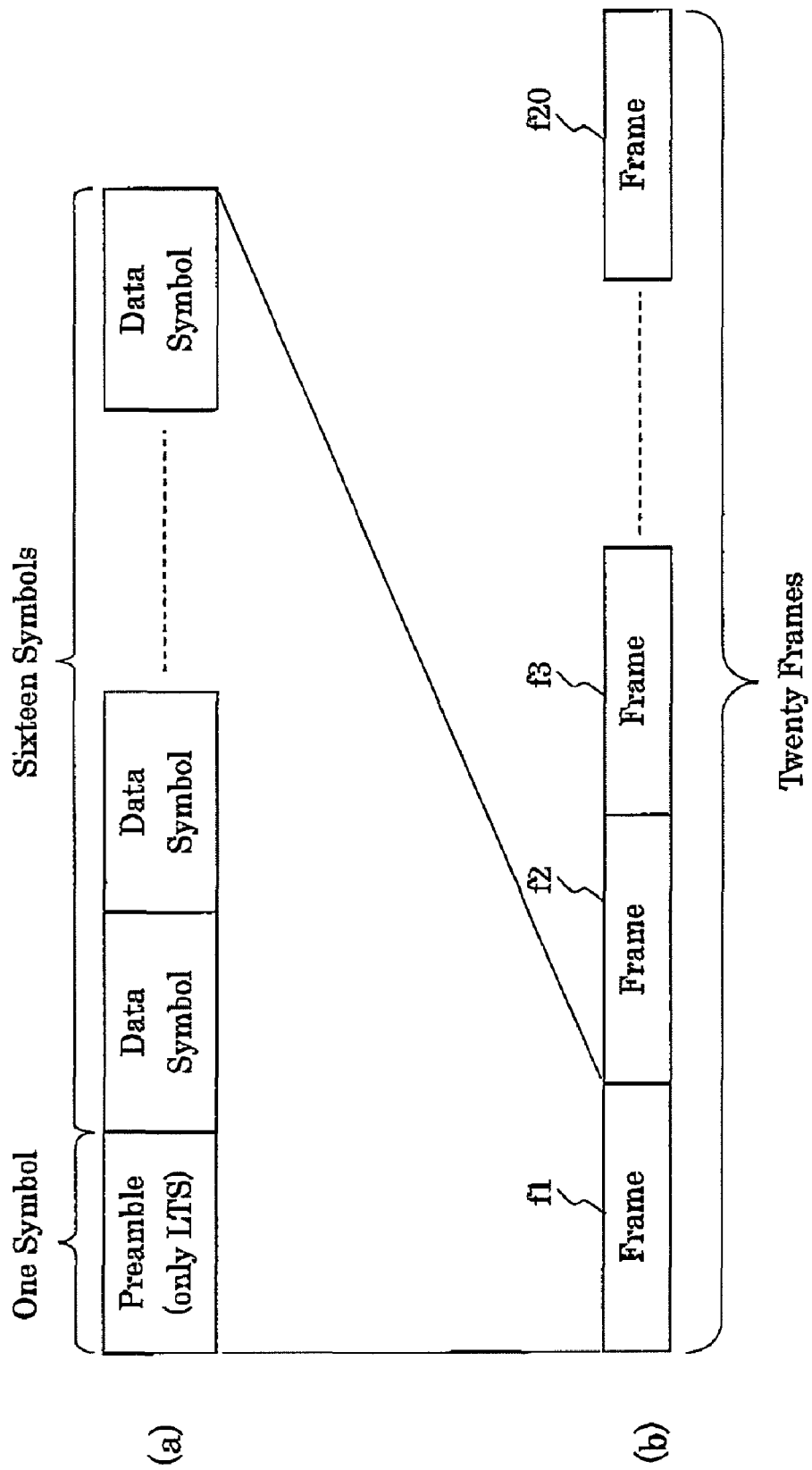
FIG. 3 is a diagram showing a configuration of the signal to be measured S according to a first embodiment.

FIG. 3 is a diagram showing a configuration of the signal to be measured S according to a first embodiment. The signal to be measured S is a signal modulated according to the OFDM modulation, and includes multiple frames. FIG. 3(a) shows an internal configuration of the frame. FIG. 3(b) shows a configuration of the signal to be measured S.

With reference to FIG. 3(a), the frame includes a preamble constructed by only the long training sequence (LTS) represented by one symbol, and data symbols represented by sixteen symbols. The preamble is situated at a start of the frame, and the data symbols successively follow the preamble.

It should be noted that with respect to a signal modulated according to the OFDM modulation generally, the preamble includes the short training sequences (STSs). However, the preamble according to the first embodiment does not include the short training sequences (STSs).

Moreover, a signal modulated according to the OFDM modulation generally includes a symbol referred to as SIGNAL (indicating the number of data symbols in one frame, and the modulation scheme for the respective data symbols) inserted between the preambles and the data symbols. However, the frame according to the first embodiment does not contain the SIGNAL symbol.

With reference to FIG. 3(b), the signal to be measured S includes a start frame f1 and subsequent frames f2, f3, ... f20. The start frame f1 is situated at a start of the signal to be measured S. The subsequent frame f2 is situated immediately after the start frame f1. The subsequent frame f3 is situated immediately after the subsequent frame f2. In this way, the subsequent frames up to the subsequent frame f20 are arranged. Therefore, the frames from the start frame f1 to the subsequent frame f20 are successively arranged.

A signal modulated according to the OFDM modulation is generally a burst signal including sections in which frames are not present. However, the signal to be measured S contains successive frames as shown in FIG. 3(b), and, thus, is not a burst signal.

It should be noted that the lengths of the start frame f1 and the subsequent frames f2, f3, . . . , f20 are all the same. Therefore, the position of the subsequent frame f2 is a position displaced backward from the position of the start frame f1 by the length of the frame. The position of the subsequent frame f3 is a position displaced backward from the position of the start frame f1 by twice of the length of the frame. The position of the subsequent frame f20 is a position displaced backward from the position of the start frame f1 by nineteen times of the length of the frame.

Figure 4:
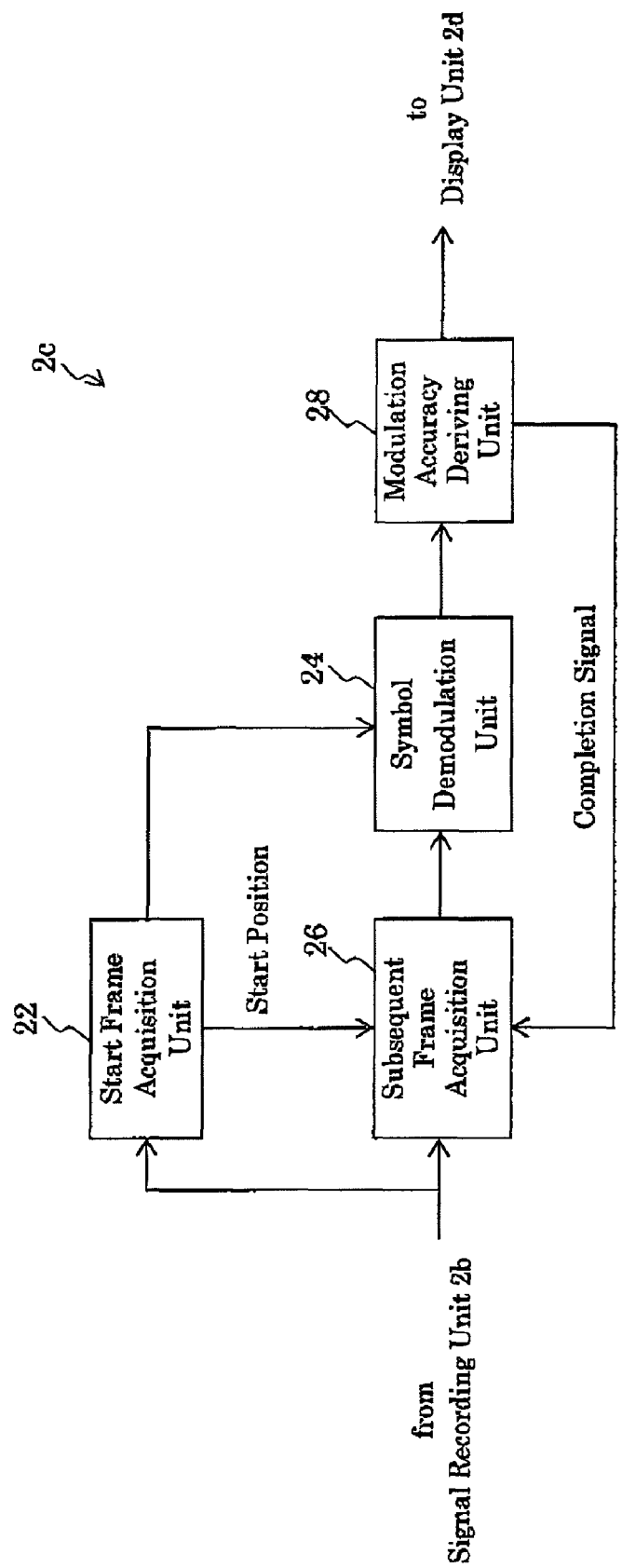
FIG. 4 is a functional block diagram showing a configuration of the signal analyzing device 2c according to the first embodiment.

FIG. 4 is a functional block diagram showing a configuration of the signal analyzing device 2c according to the first embodiment. The signal analyzing device 2c includes a start frame acquisition unit 22, a symbol demodulation unit 24, a subsequent frame acquisition unit 26, and a modulation accuracy deriving unit 28.

The start frame acquisition unit 22 acquires the start frame f1 from the signal to be measured S recorded in the signal recording unit 2b. In more detail, first, the start frame acquisition unit 22 detects the start frame f1 from the signal to be measured S. As a method for detecting the start frame f1, a widely known method for detecting a frame of a signal modulated according to the OFDM modulation may be employed. As a result of the detection, the position of the start frame f1 (referred to as "start position") is acquired. The start position is transmitted to the subsequent frame acquisition unit 26. It should be noted that the preamble includes only the long training sequence (LTS), and does not include the short training sequence (STS). However, the detection of the frame is possible only based on the long training sequence (LTS) without the short training sequence (STS).

Then, the start frame acquisition unit 22 acquires the detected start frame f1. The acquisition of the start frame f1 implies acquisition of the preamble and data symbols constituting the start frame f1. The acquired 11, start frame f1 is fed to the symbol demodulation unit 24.

The subsequent frame acquisition unit 26 receives the start position from the start frame acquisition unit 22, and acquires the position of the subsequent frame f2 by displacing the start position by the length of the frame, thereby acquiring the subsequent frame f2. Then, after receiving a completion signal from the modulation accuracy deriving unit 28, the subsequent frame acquisition unit 26 acquires the position of the subsequent frame f3 by displacing the start position by twice of the length of the frame, thereby acquiring the subsequent frame P. In this way, the subsequent frames f2 to f20 are acquired. The acquired subsequent frames f2 to f20 are fed to the symbol demodulation unit 24.

The symbol demodulation unit 24 carries out the symbol demodulation for the start frame f1 acquired by the start frame acquisition unit 22, and the subsequent frames f2 to f20 acquired by the subsequent frame acquisition unit 26. The symbol demodulation is well known, and a description thereof is therefore omitted. It should be noted that the signal to be measured S does not include the SIGNAL frame. However, it is possible to carry out the demodulation without the SIGNAL frame by specifying the modulation scheme for the respective data symbols in advance. Moreover, though it is necessary to estimate various correction data for the symbol demodulation, the long training sequence (LTS) in the preambles enable the estimation of the various correction data without the short training sequence (STS).

The modulation accuracy deriving unit 28 derives the modulation accuracy based on an output from the symbol demodulation unit 24. The method for deriving the modulation accuracy is well known, and thus will not be further explained. When the modulation accuracy deriving unit 28 has derived the modulation accuracies for the respective frames, the modulation accuracy deriving unit 28 supplies the completion signal to the subsequent frame acquisition unit 26. Moreover the modulation accuracy deriving unit 28 averages the modulation accuracies derived for the respective frames, and supplies the averaged modulation accuracy to the display unit 2d. The display unit 2d displays the averaged modulation accuracy as the modulation accuracy of the signal to be measured S.

Figure 5:
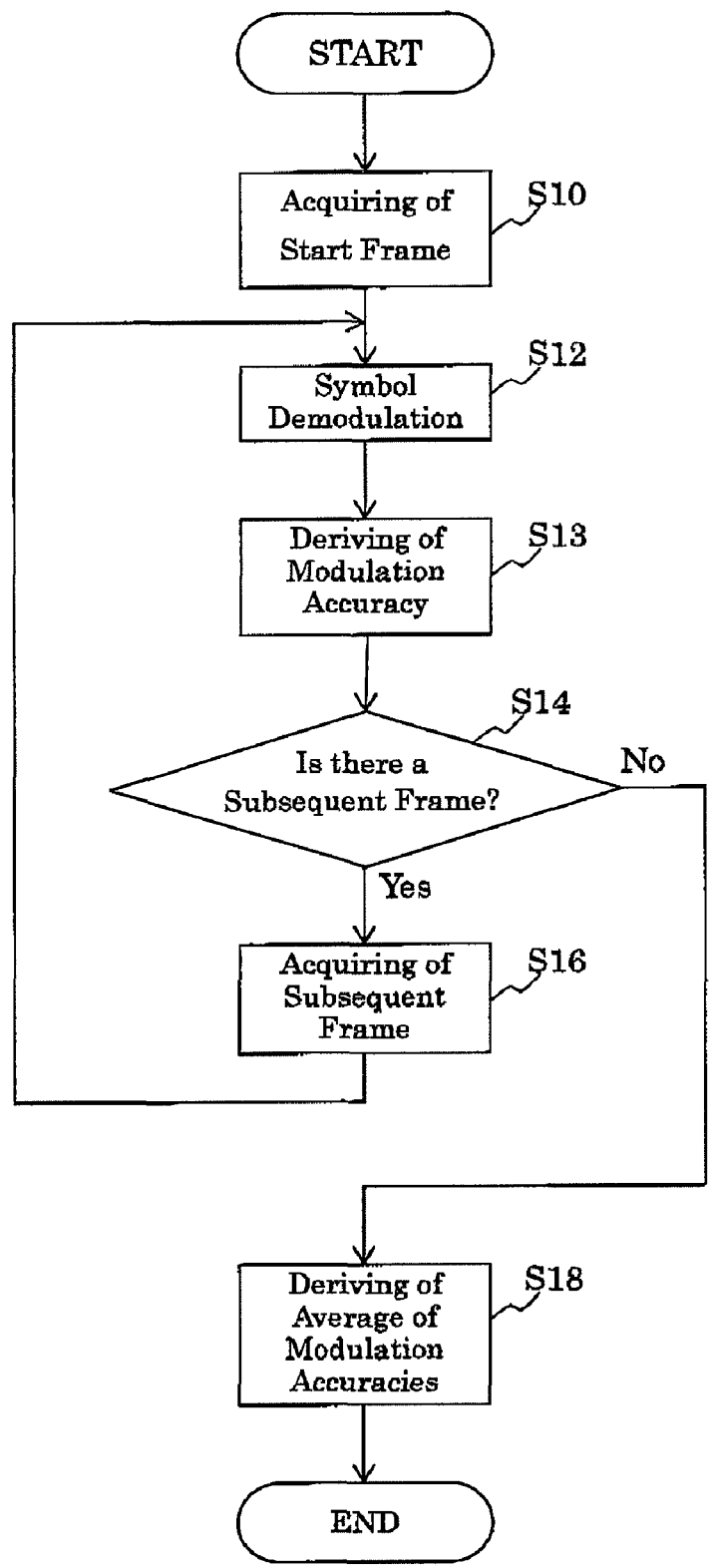
FIG. 5 is a flowchart showing an operation of the signal analyzing device 2c according to the first embodiment.

A description will now be given of an operation of the first embodiment with reference to a flowchart in FIG. 5. FIG. 5 is a flowchart showing an operation of the signal analyzing device 2c according to the first embodiment.

The signal to be measured S transmitted from the OFDM signal transmitting device 1 is received by the OFDM signal receiving device 2. The signal to be measured S is digitized by the A/D converter 2a of the OFDM signal receiving device 2, and is then recorded in the signal recording unit 2b. The signal to be measured S recorded in the signal recording unit 2b is received and analyzed by the signal analyzing device 2c. A description will now be given of an operation carried out in the analysis.

The start frame acquisition unit 22 first acquires the start frame f1 from the signal to be measured S recorded in the signal recording unit 2b (S10). The acquired start frame f1 (preamble and data symbols) is fed to the symbol demodulation unit 24.

The symbol demodulation unit 24 carries out the symbol demodulation for the acquired start frame f1 (S12).

The modulation accuracy deriving unit 28 derives the modulation accuracy from the result of the symbol demodulation carried out by the symbol demodulation unit 24 (S13). When the modulation accuracy deriving unit 28 has derived the modulation accuracy for the start frame f1, the modulation accuracy deriving unit 28 supplies the completion signal to the subsequent frame acquisition unit 26.

When the subsequent frame acquisition unit 26 receives the completion signal, the subsequent frame acquisition unit 26 determines whether there is a subsequent frame (which has not been acquired yet) of the subsequent frames f2 to f20 (S14). For example, it is determined that the signal to be measured S includes twenty frames (nineteen (20−=19) subsequent frames) before the analysis is carried out by the signal analyzing device 2c. In this case, there remain subsequent frames until the number of the frames acquired by the subsequent frame acquisition unit 26 reaches nineteen.

As described above, if the number of frames contained in the signal to be measured S is determined in advance, the subsequent frame acquisition unit 26 can determine presence/absence of the remaining subsequent frames (S14).

When the modulation accuracy has been derived for the start frame f1, the subsequent frame acquisition unit 26 has not acquired subsequent frames yet. Thus, there are subsequent frames ("YES" in the step S14).

Then, the subsequent frame acquisition unit 26 acquires the subsequent frame f2 (S16). In more detail, the subsequent frame acquisition unit 26 receives the start position from the start frame acquisition unit 22. Further, the subsequent frame acquisition unit 26 acquires the position of the subsequent frame f2 by displacing the start position by the length of the frame, thereby acquiring the subsequent frame f2. The acquired subsequent frame f2 (preamble and data symbols) is fed to the symbol demodulation unit 24.

Then, the operation returns to the symbol demodulation (S12). The symbol demodulation unit 24 demodulates the acquired subsequent frame f2 (S12). Moreover, the modulation accuracy is derived (S13), and after the modulation accuracy has been derived, the completion signal is fed to the subsequent frame acquisition unit 26.

When the subsequent frame acquisition unit 26 receives the completion signal, the subsequent frame acquisition unit 26 determines whether there is a subsequent frame (which has not been acquired yet) (S14). When the modulation accuracy has been derived for the subsequent frame A2, the number of the subsequent frames acquired by the subsequent frame acquisition unit 26 is one, and has not reached nineteen yet. Thus, there are subsequent frames ("YES" in the step S14).

Then, the subsequent frame acquisition unit 26 acquires the subsequent frame f3 (S16). In more detail, the subsequent frame acquisition unit 26 receives the start position from the start frame acquisition unit 22. Further, the subsequent frame acquisition unit 26 acquires the position of the subsequent frame f3 by displacing the start position by twice of the length of the frame, thereby acquiring the subsequent frame f3. The acquired subsequent frame f3 (preamble and data symbols) is fed to the symbol demodulation unit 24.

Then, the operation returns to the symbol demodulation (S12). The symbol demodulation unit 24 carries out the symbol demodulation for the acquired subsequent frame f2 (S12). Moreover, the modulation accuracy is derived (S13), and after the modulation accuracy has been derived, the completion signal is fed to the subsequent frame acquisition unit 26.

In this way, for the start frame f1 and the subsequent frames f2 to f20, the symbol demodulation unit 24 carries out the symbol demodulation (S12), and the modulation accuracy deriving unit 28 derives the modulation accuracies (S13).

The modulation accuracy is derived for the subsequent frame f20 (S13), and after the modulation accuracy has been derived, the completion signal is fed to the subsequent frame acquisition unit 26.

When the subsequent frame acquisition unit 26 receives the completion signal, the subsequent frame acquisition unit 26 determines whether there is a subsequent frame (which has not been acquired yet) (S14). When the modulation accuracy has been derived for the subsequent frame f20, the number of the subsequent frames acquired by the subsequent frame acquisition unit 26 has reached nineteen. Thus, there is no subsequent frame ("NO" in the step S14).

Then, the modulation accuracy deriving unit 28 derives the average of the modulation accuracies derived for the respective frames (S18).

The average of the modulation accuracies is fed to the display unit 2d. The display unit 2d displays the averaged modulation accuracy as the modulation accuracy of the signal to be measured S.

According to the first embodiment, it is possible to reduce the time required for analyzing the modulation accuracy of a modulated signal.

In other words, since the frames are successive in the signal to be measured S (the signal to be measured S is not a burst wave), the subsequent frame acquisition unit 26 does not have to carry out a frame detection process, which is time-consuming, and the subsequent frame acquisition unit 26 can acquire the position of a subsequent frame by displacing the start position by an integer multiple of the length of the frame. As a result, it is possible to reduce the time required for analyzing the modulation accuracy of the modulated signal.

Moreover, since the preamble includes only the long training sequence (LTS), it is possible to shorten the preamble compared with that of an ordinary signal modulated according to the OFDM modulation. As a result, it is possible to reduce the time required for processing the preamble, and thus to reduce the time required for the analysis.

Further, since the signal to be measured S does not include the "SIGNAL" symbol, compared with the processing for an ordinary signal modulated according to the OFDM modulation, the time required for the processing is reduced by a time required for processing the "SIGNAL" symbol. As a result, it is possible to reduce the time required for the analysis.

Second Embodiment

Figure 6:
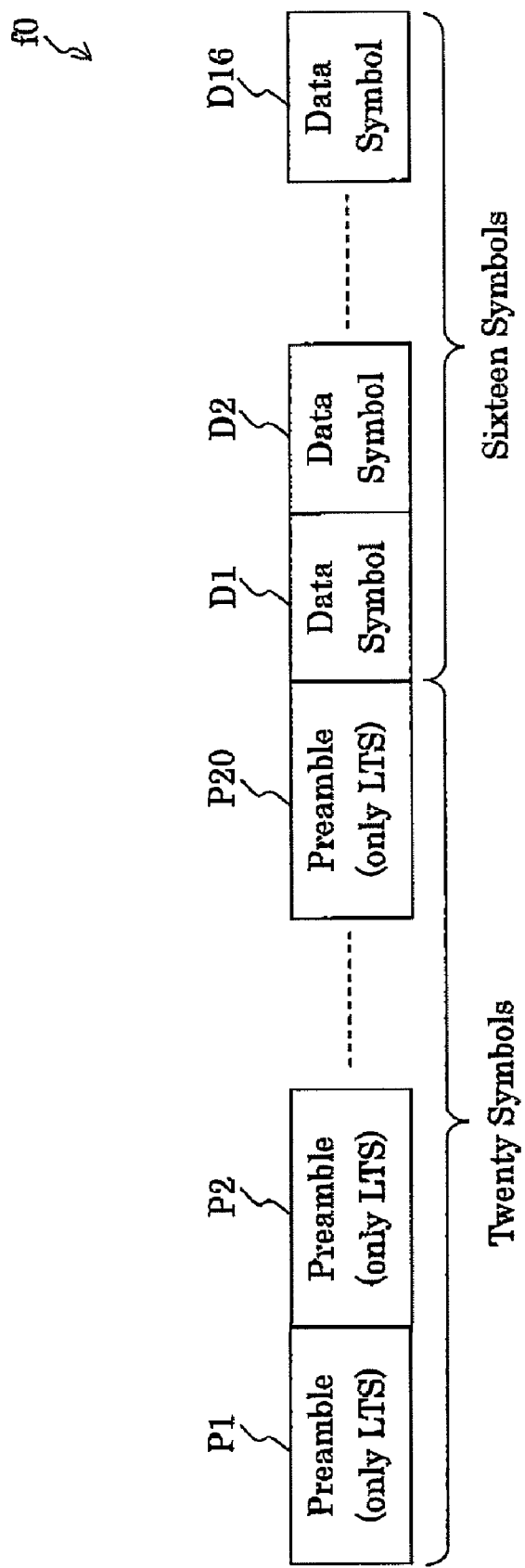
FIG. 6 is a diagram showing a configuration of the signal to be measured S according to a second embodiment.

FIG. 6 is a diagram showing a configuration of the signal to be measured S according to a second embodiment. The signal to be measured S is a signal modulated according to the OFDM modulation, and includes a single frame ft. The frame f0 includes multiple preambles P1, P2, . . . , P20 successively arranged, and data symbols D1, D2, . . . , D16 successively arranged subsequent to the multiple preambles. The preamble P1 is referred to as start preamble, and preambles P2 to P20 are referred to as subsequent preambles.

It should be noted that a signal modulated according to the OFDM modulation generally includes the short training sequences (STSs) in the preamble. However, the preambles P1, P2, . . . , P20 according to the second embodiment do not include the short training sequences (STSs). The preambles P1, P2, . . . , P20 according to the second embodiment include only the long training sequences (LTSs).

Moreover, a signal modulated according to the OFDM modulation generally includes a symbol referred to as SIGNAL (indicating the number of data symbols in one frame, and the modulation scheme for the respective data symbols) inserted between the preamble and the data symbols. However, the frame f0 according to the second embodiment does not contain the SIGNAL symbol.

Figure 7:
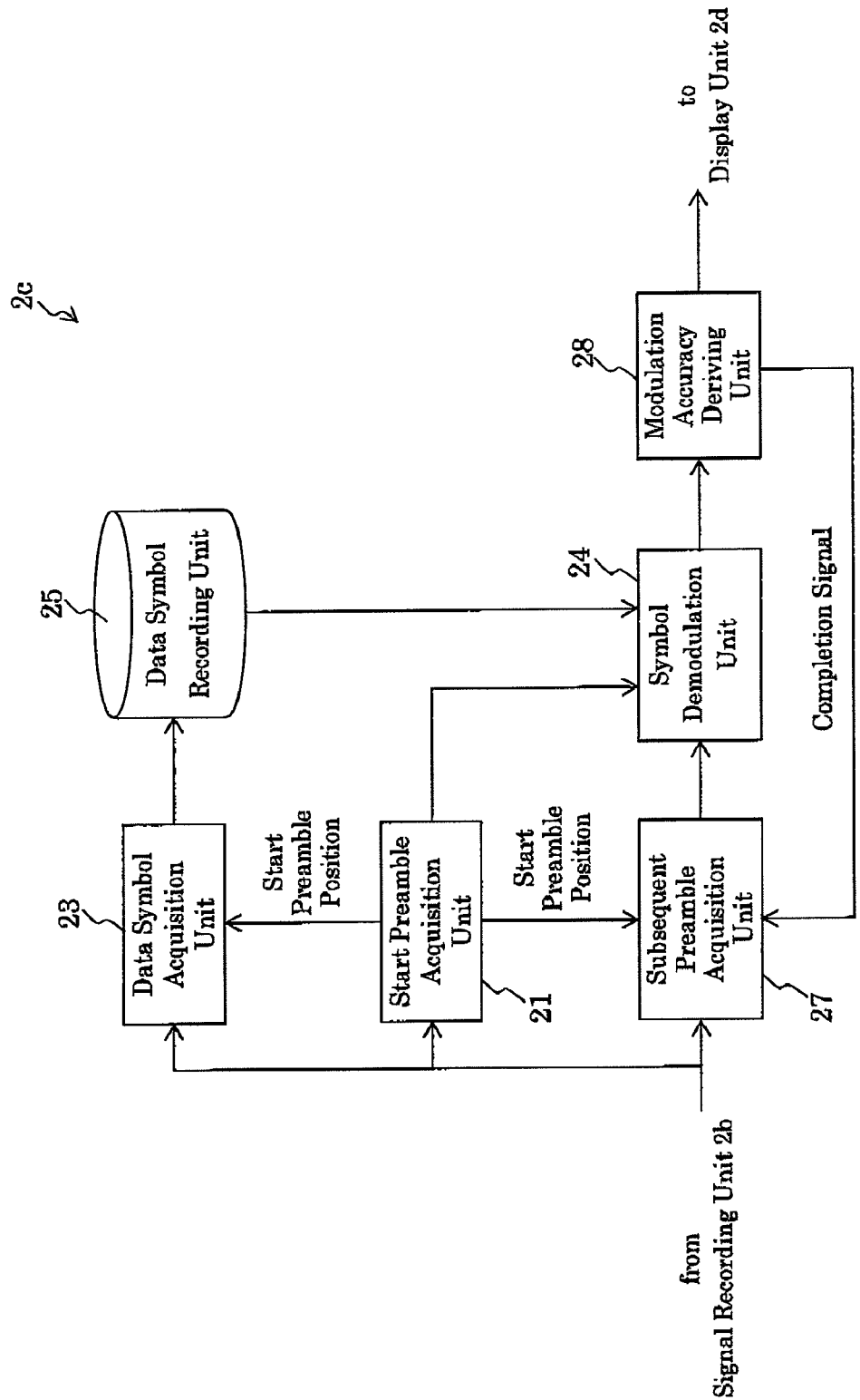
FIG. 7 is a functional block diagram showing a configuration of the signal analyzing device 2c according to the second embodiment.

FIG. 7 is a functional block diagram showing a configuration of the signal analyzing device 2c according to the second embodiment. The signal analyzing device 2c includes a start preamble acquisition unit 21, a data symbol acquisition unit 23, the symbol demodulation unit 24, a data symbol recording unit 25, a subsequent preamble acquisition unit 27, and the modulation accuracy deriving unit 28.

The start preamble acquisition unit 21 acquires the start preamble P1 from the signal to be measured S recorded in the signal recording unit 2b. In more detail, first, the start preamble acquisition unit 21 detects the frame f0 from the signal to be measured S. As a method for detecting the frame f0, a widely known method for detecting a frame of a signal modulated according to the OFDM modulation may be employed. As a result of the detection, the position of the start preamble P1 (referred to as "start preamble position") is acquired. The start preamble position is transmitted to the data symbol acquisition unit 23 and the subsequent preamble acquisition unit 27. It should be noted that the start preamble P1 includes only the long training sequence (LTS), and does not include the short training sequence (STS). However, the detection of the frame is possible only based on the long training sequence (LTS) without the short training sequence (STS).

Then, the start preamble acquisition unit 21 acquires the detected start preamble P1. The acquired start preamble P1 is fed to the symbol demodulation unit 24.

The subsequent preamble acquisition unit 27 receives the start preamble position from the start preamble acquisition unit 21, and acquires the position of the subsequent preamble P2 by displacing the start preamble position by the length of the preamble, thereby acquiring the subsequent preamble P2. Then, after receiving a completion signal from the modulation accuracy deriving unit 28, the subsequent preamble acquisition unit 27 acquires the position of the subsequent preamble P3 by displacing the start preamble position by twice of the length of the preamble, thereby acquiring the subsequent preamble P3. In this way, the subsequent preambles P2 to P20 are acquired one by one. The acquired subsequent preambles P2 to P20 are fed to the symbol demodulation unit 24.

It should be noted that the start preamble acquisition unit 21 and the subsequent preamble acquisition unit 27 acquire the preambles P1 and P2 to P20 one by one.

The data symbol acquisition unit 23 acquires the data symbols D1, D2, ..., D16, and causes the data symbol recording unit 25 to record the data symbols. A position at which the data symbol D1 starts is a position at which the subsequent preamble P20 ends, and is thus displaced backward from the start preamble position by twenty times of the length of the preambles. Thus, the data symbol acquisition unit 23 receives the start preamble position from the start preamble acquisition unit 21, and displaces backward from the start preamble position by twenty times of the length of the preamble, thereby acquiring the position at which the data symbol D1 starts. Then, the data symbol acquisition unit 23 acquires the data symbols D1, D2, ..., D16 from the position at which the data symbol D1 starts.

The data symbol recording unit 25 records the data symbols D1, D2, ..., D16 acquired by the data symbol acquisition unit 23.

The symbol demodulation unit 24, based on one of the preambles acquired by the start preamble acquisition unit 21 or the subsequent preamble acquisition unit 27, carries out the symbol demodulation for the data symbols recorded in the data symbol recording unit 25.

In other words, based on the start preamble P1 acquired by the start preamble acquisition unit 21, the data symbols D1, D2, ..., D16 are demodulated according to the symbol demodulation. Moreover, based on the subsequent preamble P2 acquired by the subsequent preamble acquisition unit 27, the data symbols D1, D2, ..., D16 are demodulated according to the symbol demodulation. Further, based on the subsequent preamble P3 acquired by the subsequent preamble acquisition unit 27, the data symbols D1, D2, ..., D16 are demodulated according to the symbol demodulation. Similarly, based on the respective subsequent preambles up to the subsequent preamble P20, the common data symbols D1, D2, ..., D16 are demodulated according to the symbol demodulation.

It should be noted that it is necessary for the symbol demodulation to estimate various correction data. The various correction data can be estimated based on the preamble. The symbol demodulation unit 24 acquires the preamble from the start preamble acquisition unit 21 or the subsequent preamble acquisition unit 27. Based on the acquired preamble, the various correction data can be estimated. On this occasion, as long as the preamble contain the long training sequence (LTS), it is possible to estimate the various correction data without the short training sequence (STS).

The modulation accuracy deriving unit 28 derives the modulation accuracy based on an output from the symbol demodulation unit 24. The method for deriving the modulation accuracy is well known, and thus will not be further explained. When the modulation accuracy deriving unit 28 has derived the modulation accuracies for the respective preambles, the modulation accuracy deriving unit 28 supplies the completion signal to the subsequent preamble acquisition unit 27. Moreover the modulation accuracy deriving unit 28 averages the modulation accuracies derived for the respective preambles, and supplies the averaged modulation accuracy to the display unit 2d. The display unit 2d displays the averaged modulation accuracy as the modulation accuracy of the signal to be measured S.

Figure 8:
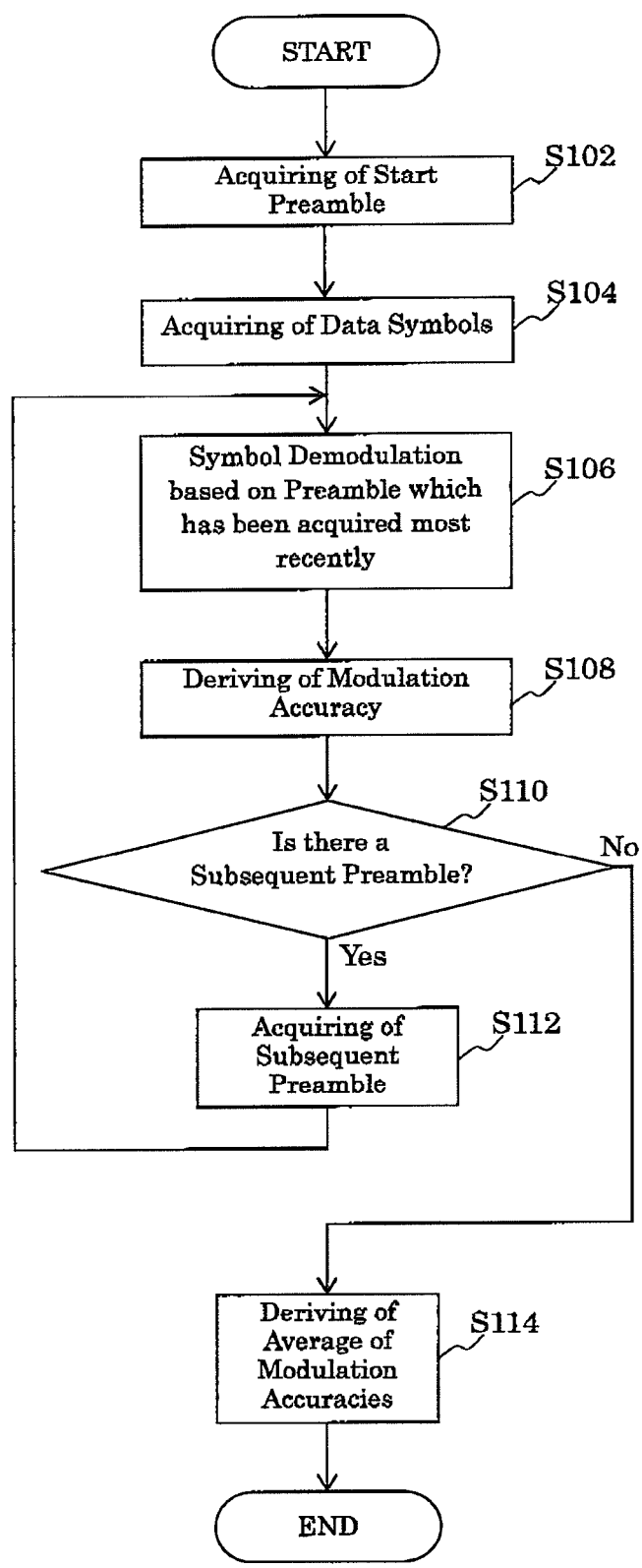
FIG. 8 is a flowchart showing an operation of the signal analyzing device 2c according to the second embodiment.

A description will now be given of an operation of the second embodiment with reference to a flowchart in FIG. 8. FIG. 8 is a flowchart showing an operation of the signal analyzing device 2c according to the second embodiment.

The signal to be measured S transmitted from the OFDM signal transmitting device 1 is received by the OFDM signal receiving device 2. The signal to be measured S is digitized by the A/D converter 2a of the OFDM signal receiving device 2, and is then recorded in the signal recording unit 2b. The signal to be measured S recorded in the signal recording unit 2b is received and analyzed by the signal analyzing device 2c. A description will now be given of an operation carried out in the analysis.

The start preamble acquisition unit 21 first acquires the start preamble P1 from the signal to be measured S recorded in the signal recording unit 2b (S102): The acquired start preamble P1 is fed to the symbol demodulation unit 24.

Further, the data symbol acquisition unit 23 acquires the data symbols D1, D2, ..., D16 (S104). The acquired data symbols are recorded in the data symbol recording unit 25.

The symbol demodulation unit 24 demodulates, according to the symbol demodulation, the data symbols D1, D2, ..., D16 recorded in the data symbol recording unit 25 based on the preamble which has been acquired most recently (S106). In this case, the preamble acquired most recently is the start preamble P1. Thus, the data symbols D1, D2, ..., D16 are demodulated according to the symbol demodulation based on the start preamble P1.

The modulation accuracy deriving unit 28 derives the modulation accuracy from the result of the symbol demodulation carried out by the symbol demodulation unit 24 (S108). When the modulation accuracy deriving unit 28 has derived the modulation accuracy based on the start preamble P1, the modulation accuracy deriving unit 28 supplies the completion signal to the subsequent preamble acquisition unit 27.

When the subsequent preamble acquisition unit 27 receives the completion signal, the subsequent preamble acquisition unit 27 determines whether there is a subsequent preamble (which has not been acquired yet) of the subsequent preambles P2 to P20 (S110). For example, it is determined that the signal to be measured S includes twenty preambles (nineteen (20−1=19) subsequent preambles) before the analysis is carried out by the signal analyzing device 2c. In this case, there remain subsequent preambles P2 to P20 until the number of the preambles acquired by the subsequent preamble acquisition unit 27 reaches nineteen.

When the modulation accuracy has been derived based on the start preamble P1, the subsequent preamble acquisition unit 27 has not acquired subsequent preambles yet. Thus, there are subsequent preambles ("YES" in the step S110).

Then, the subsequent preamble acquisition unit 27 acquires the subsequent preamble P2 (S112). The acquired subsequent preamble P2 is fed to the symbol demodulation unit 24.

Then, the operation returns to the symbol demodulation based on the preamble acquired most recently (S106). The preamble acquired most recently is the subsequent preamble P2. Thus, the symbol demodulation unit 24, based on the subsequent preamble P2, demodulates, according to the symbol demodulation, data symbols D1, D2, ..., D16. Moreover, the modulation accuracy is derived (S108), and after the modulation accuracy has been derived, the completion signal is fed to the subsequent preamble acquisition unit 27.

When the subsequent preamble acquisition unit 27 receives the completion signal, the subsequent preamble acquisition unit 27 determines whether there is a subsequent preamble (which has not been acquired yet) of the preambles P2 to P20 (S110).

When the modulation accuracy has been derived based on the subsequent preamble P2, the number of the subsequent preambles which the subsequent preamble acquisition unit 27 has acquired is one, and has not reached nineteen yet. Thus, there are subsequent preambles ("YES" in the step S110).

Then, the subsequent preamble acquisition unit 27 acquires the subsequent preamble P3 (S112). The acquired subsequent preamble P3 is fed to the symbol demodulation unit 24.

Then, the operation returns to the symbol demodulation based on the preamble acquired most recently (S106). The preamble acquired most recently is the subsequent preamble P3. Thus, the symbol demodulation unit 24, based on the subsequent preamble P3, demodulates, according to the symbol demodulation, data symbols D1, D2, ..., D16. Moreover, the modulation accuracy is derived (S108), and after the modulation accuracy has been derived, the completion signal is fed to the subsequent preamble acquisition unit 27.

In this way, based on the respective preambles P1, P2, P3, ..., P20, the common data symbols D1, D2, ..., D16 are demodulated according to the symbol demodulation (S106), and the modulation accuracy is derived (S108).

The modulation accuracy is derived for the subsequent preamble P20 (S108), and after the modulation accuracy has been derived, the completion signal is fed to the subsequent frame acquisition unit 26.

When the subsequent preamble acquisition unit 27 receives the completion signal, the subsequent preamble acquisition unit 27 determines whether there is a subsequent preamble (which has not been acquired yet) exists (S110). When the modulation accuracy has been derived for the subsequent preamble P20, the number of the subsequent frames acquired by the subsequent preamble acquisition unit 27 has reached nineteen. Thus, there is no subsequent preamble ("NO" in the step S110).

Then, the modulation accuracy deriving unit 28 derives the average of the modulation accuracies derived for the respective preambles (S114).

The average of the modulation accuracies is fed to the display unit 2d. The display unit 2d displays the averaged modulation accuracy as the modulation accuracy of the signal to be measured S.

According to the second embodiment, it is possible to reduce the time required for analyzing the modulation accuracy of a modulated signal.

One of causes of an error in the modulation accuracy is an error in the preambles. In other words, when there is an error in the preambles, an error is generated in the estimation of the channel. Based on a result of the channel estimation including the error, frequency characteristics of the data symbols are corrected, and the modulation accuracy is derived based on the corrected data symbols. Thus, the error occurs in the modulation accuracy. In order to reduce the error in the modulation accuracy, IEEE 802.11a specifies that, upon the analysis of the modulation accuracy, twenty or more frames are to be measured.

In other words, even if there is no error in the data symbols, an error in the preambles generates an error in the modulation accuracy. Therefore, the analysis of the modulation accuracy based on the demodulation of the common data symbols according to the symbol demodulation using the twenty preambles brings about a measured result similar to that brought about by an analysis of the modulation accuracy based on measurement of twenty frames.

Thus, by measuring the signal to be measured S according to the second embodiment, it is possible to determine the modulation accuracy as precisely as in the conventional case. Furthermore, according to the second embodiment, it is only necessary to acquire sixteen data symbols, instead of 16×20=320 data symbols, which is required for a conventional case, and it is thus possible to reduce the time required for the analysis of the modulation accuracy of a modulated signal.

Moreover, since the preamble includes only the long training sequences (LTS), it is possible to shorten the preamble compared with that of an ordinary signal modulated according to the OFDM modulation. As a result, it is possible to reduce the time required for processing the preambles, and thus to reduce the time required for the analysis.

Moreover, since the signal to be measured S does not include the "SIGNAL" symbol, compared with the processing for an ordinary signal modulated according to the OFDM modulation, the time required for the processing is reduced by a time required for processing the "SIGNAL" symbol. As a result, it is possible to reduce the time required for the analysis.

Moreover, the above-described embodiment may be realized in the following manner. A computer is provided with a CPU, a hard disk, and a medium (such as a floppy disk (registered trade mark) and a CD-ROM reader, and the media reader is caused to read a medium recording a program realizing the above-described respective components (such as the signal analyzing device 2c), thereby installing the program on the hard disk. This method may also realize the above-described functions.

The invention claimed is:

1. A signal analyzing device for analyzing a signal to be measured including multiple frames each of which includes a preamble and a data symbol, comprising:
   a frame acquirer that acquires a frame from the signal to be measured;
   a symbol demodulator that demodulates the frame acquired by the frame acquirer according to symbol demodulation; and
   a modulation accuracy deriver that derives a modulation accuracy based on an output from the symbol demodulator,
   wherein the frame acquirer considers a position displaced by an integer multiple of the length of the frame from a start frame positioned at a start of the signal to be measured as a position of a subsequent frame positioned after the start frame, and acquires the subsequent frame.

2. The signal analyzing device according to claim 1, wherein the frames are successive in the signal to be measured.

3. The signal analyzing device according to claim 1, wherein the signal to be measured is a signal modulated according to the orthogonal frequency division multiplexing (OFDM) modulation, and the preamble includes only a long training sequence.

4. The signal analyzing device according to claim 2, wherein the signal to be measured is a signal modulated according to the orthogonal frequency division multiplexing (OFDM) modulation, and the preamble includes only a long training sequence.

5. A signal analyzing device for analyzing a signal to be measured including a frame which includes a data symbol and multiple preambles, comprising:
    a preamble acquirer that acquires the multiple preambles one by one;
    a data symbol acquirer that acquires the data symbol;
    a symbol demodulator that demodulates the data symbol according to symbol demodulation based on each of the multiple preambles acquired by the preamble acquirer; and
    a modulation accuracy deriver that derives a modulation accuracy based on an output from the symbol demodulator,
    wherein the data symbol demodulated by the symbol demodulator according to the symbol demodulation based on each of the multiple preambles acquired by the preamble acquirer is common.

6. The signal analyzing device according to claim 5, wherein, in the frame, the multiple preambles are successive, and the data symbol is arranged subsequent to the multiple preambles.

7. The signal analyzing device according to claim 5, wherein the signal to be measured is a signal modulated according to the orthogonal frequency division multiplexing (OFDM) modulation, and the preamble includes only a long training sequence.

8. The signal analyzing device according to claim 6, wherein the signal to be measured is a signal modulated according to the orthogonal frequency division multiplexing (OFDM) modulation, and the preamble includes only a long training sequence.

9. A signal analyzing method for analyzing a signal to be measured including multiple frames each of which includes a preamble and a data symbol, comprising:
    acquiring a frame from the signal to be measured;
    demodulating the frame according to symbol demodulation; and
    deriving a modulation accuracy based on an output of the demodulating,
    wherein the acquiring considers a position displaced by an integer multiple of a length of the frame from a start frame positioned at a start of the signal to be measured as a position of a subsequent frame positioned after the start frame, and acquires the subsequent frame.

10. A signal analyzing method for analyzing a signal to be measured including a frame which includes a data symbol and multiple preambles, comprising:
    acquiring the multiple preambles one by one;
    acquiring the data symbol;
    demodulating the data symbol according to symbol demodulation based on each of the multiple preambles; and
    deriving a modulation accuracy based on an output from of the demodulating,
    wherein the data symbol demodulated by the demodulating according to the symbol demodulation based on each of the multiple preambles is common.

11. A non-transitory computer-readable medium having a program of instructions for execution by a computer to perform a signal analyzing process for analyzing a signal to be measured including multiple frames each of which includes a preamble and a data symbol, said signal analyzing process comprising:
    acquiring a frame from the signal to be measured;
    demodulating the frame according to symbol demodulation; and
    deriving a modulation accuracy based on an output of the demodulating,
    wherein the acquiring considers a position displaced by an integer multiple of a length of the frame from a start frame positioned at a start of the signal to be measured as a position of a subsequent frame positioned after the start frame, and acquires the subsequent frame.

12. A non-transitory computer-readable medium having a program of instructions for execution by a computer to perform a signal analyzing process for analyzing a signal to be measured including a frame which includes a data symbol and multiple preambles, said signal analyzing process comprising:
    acquiring the multiple preambles one by one;
    acquiring the data symbol;
    demodulating the data symbol according to symbol demodulation based on each of the multiple preambles; and
    deriving a modulation accuracy based on an output of the demodulating,
    wherein the data symbol demodulated by the demodulating according to the symbol demodulation based on each of the multiple preambles is common.

* * * * *